UNITED STATES PATENT OFFICE.

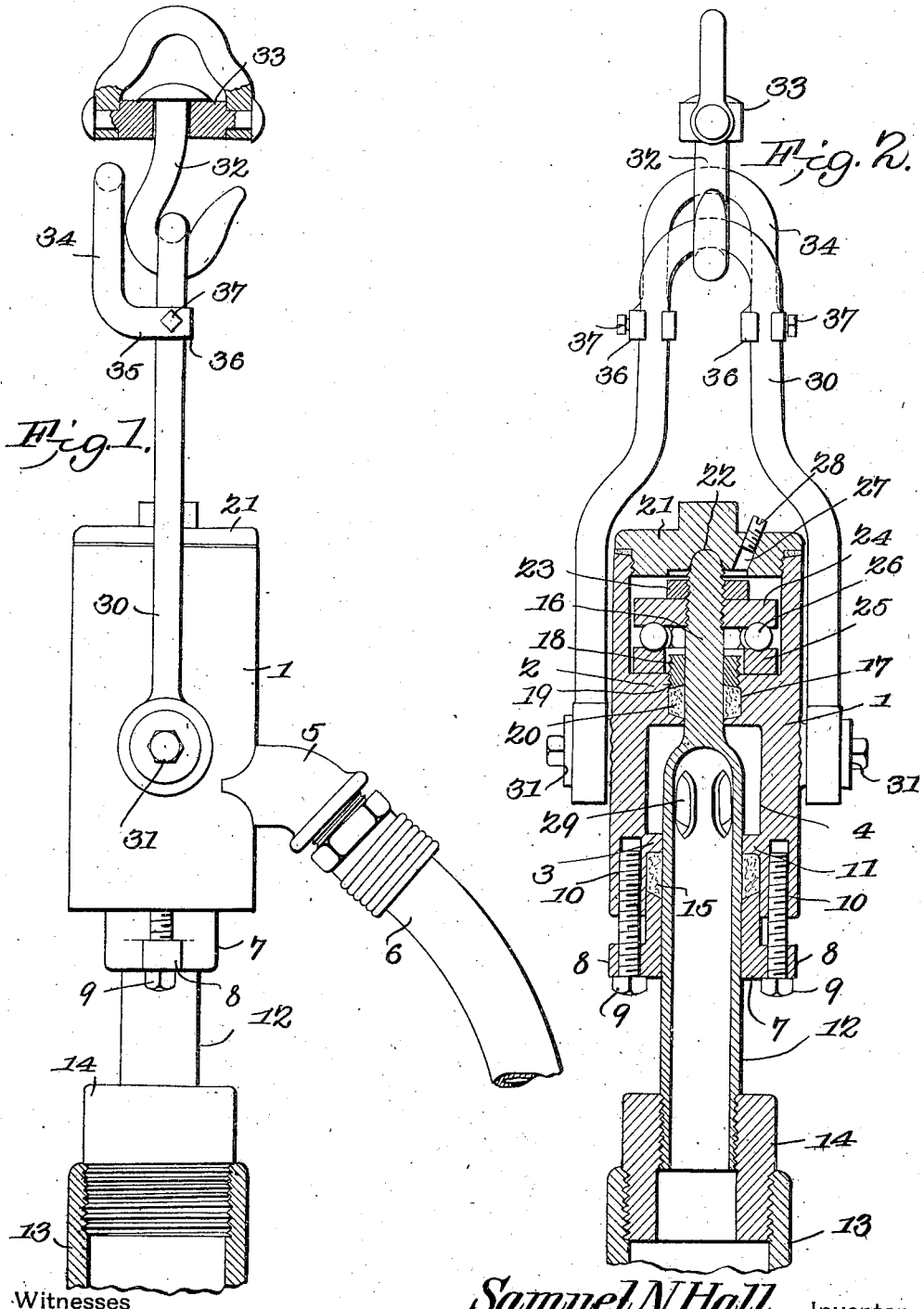

SAMUEL N. HALL, OF HOUSTON, TEXAS.

WELL-DRILLING APPARATUS.

No. 822,272.    Specification of Letters Patent.    Patented June 5, 1906.

Application filed September 21, 1905. Serial No. 279,515.

*To all whom it may concern:*

Be it known that I, SAMUEL N. HALL, a citizen of the United States, residing at Houston, in the county of Harris and State of Texas, have invented a new and useful Well-Drilling Apparatus, of which the following is a specification.

This invention relates to well-drilling apparatus, and has for its object to provide an improved connection between the drill-rod and the drill-rope, so as to permit of the free rotation of the drill-rod without twisting the connection between the latter and the rope. It is furthermore designed to adapt this connection or coupling for use in conjunction with tubular drill-rods through which water is introduced to clear the cuttings from the drill and to provide for connecting the water-supply pipe to the stationary element of the coupling, so as to avoid twisting of the water-supply pipe by the drill-rod.

As heretofore constructed the bearings of drill-rod swivels have been more or less open, whereby sand, &c., enter the bearing, which soon becomes worn and useless, thereby requiring repeated replacing of the antifriction elements, which is a serious objection, in that it consumes time and involves considerable expense. Having appreciated this defect, I propose to overcome the same by entirely housing the bearings, so as to render the same both dust and water proof, whereby rusting of the joint is obviated and the ingress of sand and the like is effectually prevented, thus maintaining the bearing in an effective working condition and materially prolonging the life thereof.

A further disadvantage existing in ordinary swivels is that as the bearing is open it is impossible to maintain a material amount of lubricant in the bearing, wherefore it is necessary to frequently lubricate the same, which is of course a serious objection. I propose to obviate this objection and to maintain the bearing submerged in the lubricant, and thereby to obviate the necessity of frequently supplying lubricant to the bearing. In this connection it is also proposed to enable the convenient introduction of lubricant to the bearing without taking the latter apart and without disturbing any of the other parts of the swivel.

A further object of the invention is to locate the bearing above the inlet of the water for washing out the cuttings and to prevent as far as possible the leakage of water into the bearing. Should any leakage occur, the lubricant would of course float upon the water, and thereby maintain the bearing in the desired lubricated position. By reason of the fact that the bearing is entirely housed the lubricant cannot become displaced by the water. Moreover, should there be any material wear of the joint between the tubular stem of the swivel and the compartment in which the bearing is housed the lubricant will be prevented from leaking downwardly through the joint by reason of the upward pressure of the water, and therefore loss of the lubricant is effectually prevented.

A still further object of the invention is to prevent accidental disconnection of the drill-rope from the coupling, particularly when the drill is suddenly arrested in its downward movement and the drill-rope continues to be lowered.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a side elevation of the coupling of the present invention. Fig. 2 is a longitudinal sectional view taken at right angles to Fig. 1.

Like characters of reference designate corresponding parts in both figures of the drawings.

As embodied in the accompanying drawings, the present coupling includes a tubular case 1, which is open at opposite ends and provided with a pair of transverse intermediate partitions 2 and 3, which produce a central compartment 4, from which leads a lateral pipe-coupling element 5, to which a flexible water-supply pipe 6 is designed to be connected. A gland 7 is fitted in the lower open end of the case 1 and is provided with opposite external perforate ears 8, through which pass adjusting-screws 9, which take into threaded seats or sockets 10 in the lower end of the case 1.

Extending longitudinally through the opening 11 in the lower partition 3 is a tubular stem member 12, which projects below the gland 7 and is connected to the tubular drill-rod 13 by means of a reducer 14, which is externally threaded upon the tube 12 and internally threaded upon the drill-rod. Suitable packing 15 is interposed between the gland 7 and the partition 3, so as to form a water-tight joint between the tube 12 and the bottom of the case 1. The upper end of the tube 12 is closed and provided with a cylindrical stem or post 16, extending through an opening 17 in the partition 2. A gland 18 loosely embraces the smooth intermediate portion of the stem 16 and is threaded into the socket 19 in the upper face of the partition 2 concentric with the stem or post 16, there being packing 20 fitted in the back of this socket, so as to form a water-tight joint between the stem and the upper end of the case. A removable closure cap or plug 21 is threaded into the top of the case 1 and is provided in its under side with a central seat or recess 22 for the reception of the upper end of the stem or post 16. Between the partition 2 and the closure-cap 21 the stem or post 16 is threaded for the reception of a nut 23, which lies upon the top of a concentric head or collar 24, embracing the stem 16. A hard-metal ring 25 is provided upon the top of the partition 2, there being antifriction-balls 26 interposed between the ring 25 and the head or collar 24, said elements having annular grooves constituting ball-races. By this construction a swivel connection is provided between the tube 12 and the case 1, whereby the tube may be turned upon its axis within the case. The antifriction-bearing is of course provided with a suitable lubricant which is originally introduced prior to the application of the closure-plug 21, the latter being provided with an opening 27, through which the bearing may be afterward lubricated. Any suitable removable closure 28 may be employed for the opening 27.

As hereinbefore described, the water-pipe 6 is in communication with the central compartment 4 through the pipe-joint 5, and in order that water may be introduced into the tubular drill-rod 13 that portion of the tube 12 which is within the compartment 4 is provided with an annular series of openings or ports 29, through which the water passes into the tube 12 and thence from the tube into the drill-rod. By this construction the tubular drill-rod is always in communication with the chamber 4, to which water is continuously supplied through the pipe 6, wherefore there is no interruption of the supply of water to the drill-rod by reason of rotary movements thereof. When the parts of the coupling are assembled, they are all housed and protected within the case 1 and at the same time are conveniently accessible for repairs.

Another important feature of the present invention resides in the fact that the water-chamber 4 is located below the swivel-bearing between the tubular element 12 and the case 1, whereby the bearing is not liable to become damp and rusted by the water, particularly as there is a water-tight joint between the partition 2 and the stem 12.

Connection between the coupling and the drill-rope (the latter not being shown) is had in the usual manner by means of a bail-shaped link 30, loosely straddling the upper portion of the case, with its opposite ends pivotally engaging studs or trunnions 31, projecting outwardly from the middle of the case, the upper end of the link being engaged with a hook 32, hung from a swivel 33, which is in turn connected to the drill-rope.

From the foregoing description it will be noted that the swivel member 1 is divided into an upper and a lower compartment, the lower compartment serving to receive the tubular element 12 and the gland or stuffing-box 7 to prevent leakage of water, while the upper compartment receives and houses the bearing between the tubular stem and the swivel member 1. By reason of the housing of the bearing the latter is dust-proof, sand-proof, and waterproof, which prevents rapid wearing of the antifriction elements and materially prolongs the life of the bearing. Furthermore, the upper compartment constitutes a chamber in which the lubricant is contained, with the bearing submerged in the lubricant, whereby the bearing is maintained in a thoroughly-lubricated condition. Again, the bearing chamber or compartment may be conveniently supplied with lubricant through the opening 27 without disturbing any of the elements of the swivel. While the packing 20 of course forms a water-tight joint between the tubular stem and the partition 2 of the swivel 1, its purpose is not so much to maintain a water-tight joint as to prevent leakage of the lubricant when first introduced and when the swivel is not in operation. This will be understood from the fact that when the drill is in operation and water is passing into the swivel the upward pressure of the water will prevent downward leakage of the lubricant through the opening in the partition 2, and as the lubricant will float upon the surface of the water the bearing will be maintained submerged in the lubricant notwithstanding the presence of water within the bottom of the upper compartment. As the upper compartment is entirely closed, the ingress of water is limited and the oil cannot become displaced, wherefore the oil operates to exclude the water to a great extent from the compartment and at least to such an extent as not to impair the running of the bearing.

Having thus described the invention, what is claimed is—

1. A well-drill swivel comprising a case having closed ends and provided with a partition dividing the case into an upper compartment and a lower compartment, the lower compartment being provided with a water-inlet, a tube rotatably piercing the bottom of the lower compartment and having that portion of the tube within the lower compartment provided with an opening for communication between said compartment and the tube, the upper portion of the tube piercing the partition and provided with a swivel-bearing within the upper compartment.

2. A well-drill swivel comprising a case having opposite closed ends and provided with a partition dividing the case into an upper compartment and a lower compartment, a tubular member rotatably piercing the bottom of the lower compartment and having that portion which is within the lower compartment provided with an opening for communication between the compartment and the tube, the partition being provided with an opening and a socket concentric with the opening, the tube having an upper portion projecting through the opening and the socket, a gland fitted in the socket, packing between the gland and the back of the socket, and a swivel-bearing for the upper portion of the tube within the upper compartment.

3. A well-drill swivel comprising a case having opposite closed ends and provided with a partition dividing the case into an upper compartment and a lower compartment, the lower compartment being provided with a water-inlet, a tubular member piercing the bottom of the lower compartment and provided with an opening communicating between the lower compartment and the tube, the upper end of the tube being provided with a stem rotatably piercing the partition, a head carried by the stem and located within the upper compartment, and antifriction devices between the head and the partition.

4. A well-drill swivel comprising a case having closed ends and provided with a partition dividing the case into an upper compartment and a lower compartment, the lower compartment being provided with a water-inlet, a tubular element rotatably piercing the bottom of the lower compartment and provided with an opening communicating between the lower compartment and the tube, the top of the tube having a stem rotatably piercing the partition, the top end of the case being provided in its inner side with a seat receiving the top of the stem, a head carried by the stem within the upper compartment, and antifriction devices interposed between the head and the partition.

5. A well-drill swivel comprising a case, a removable closure for the top of the case, a stuffing-box for the lower end of the case, a partition dividing the case into an upper compartment and a lower compartment, the lower compartment being provided with a water-inlet, a rotatable tube extending through the stuffing-box and into the lower compartment, that portion of the tube within the lower compartment having an opening for communication therewith, the partition being provided with an opening and a socket concentric therewith, the upper end of the tube having a stem passing through the opening in the partition and into the upper compartment with its upper extremity bearing against the removable closure, packing within the socket, a gland within the socket, a head carried by the stem and located in the upper compartment, and antifriction devices interposed between the head and the partition.

6. A well-drill swivel comprising a case having opposite closed ends and provided with a partition dividing the case into an upper compartment and a lower compartment, the lower compartment having a water-inlet, and a swiveled bearing located within and entirely housed by the upper compartment.

7. A well-drill swivel comprising a case having opposite closed ends and provided with a partition dividing the case into an upper compartment and a lower compartment, the lower compartment having a water-inlet, a rotatable tubular stem piercing the bottom of the lower compartment and the partition and in communication with the lower compartment, and a swiveled bearing for the stem within and completely housed by the upper compartment.

8. A well-drill swivel comprising a case having opposite closed ends and provided with a partition dividing the case into an upper compartment and a lower compartment, a water-inlet for the lower compartment, the upper compartment constituting a lubricant-reservoir and provided with a filling-opening, a rotatable tubular stem piercing the bottom of the lower compartment and the partition, said tubular stem being in communication with the lower compartment, and a swiveled bearing for the stem within and entirely housed by the upper compartment.

9. A well-drill swivel comprising a case having a lower closed end, a removable closure for the upper end of the case, a partition dividing the case into an upper compartment and a lower compartment, the lower compartment having a water-inlet, a swiveled bearing within and entirely housed by the upper compartment, and a tubular stem piercing the bottom of the lower compartment and the partition and hung upon the bearing.

In testimony that I claim the foregoing as my own I have hereto affixed my signature in the presence of two witnesses.

SAMUEL N. HALL.

Witnesses:
J. ROSS COLHOUN,
C. E. DOYLE.